May 17, 1955     J. W. ERICKSON     2,708,564
TURBINE APPARATUS
Filed Feb. 29, 1952
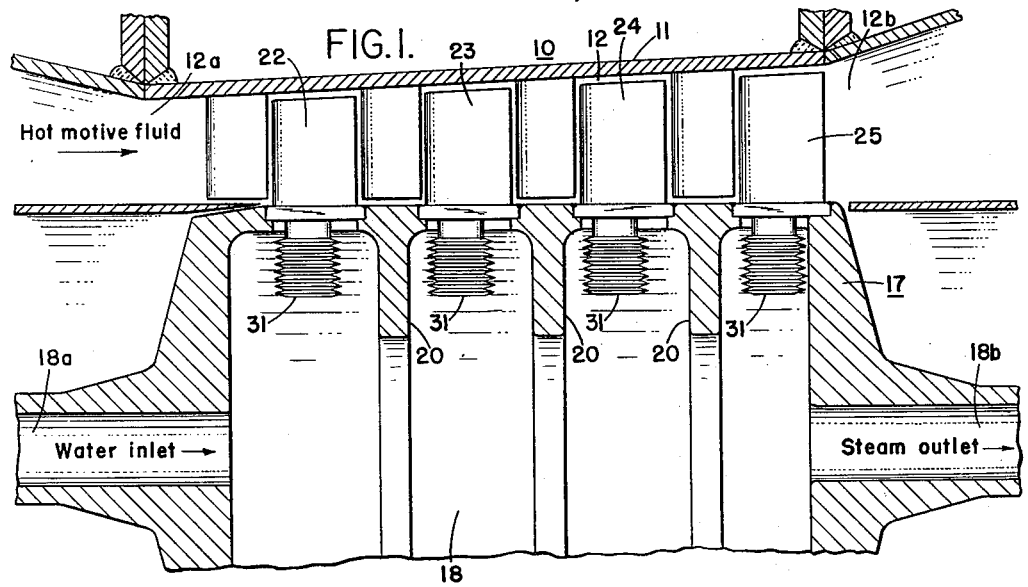
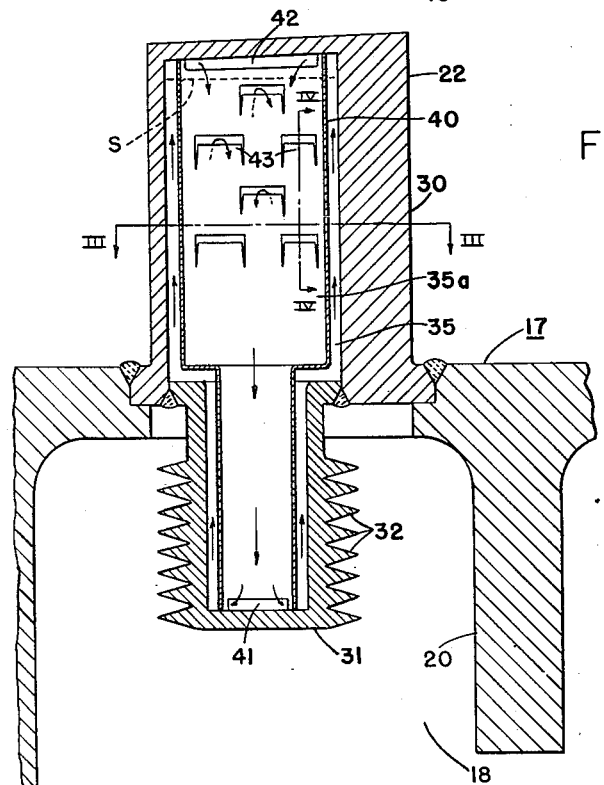
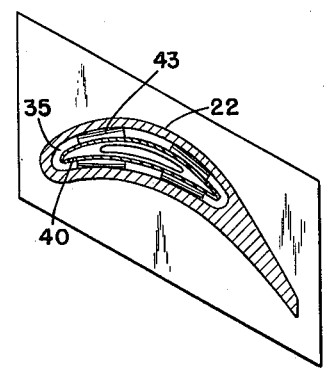
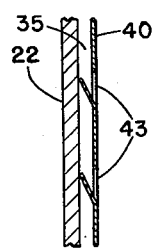
INVENTOR
JOHN W. ERICKSON
BY
ATTORNEY

United States Patent Office 2,708,564
Patented May 17, 1955

2,708,564

TURBINE APPARATUS

John W. Erickson, Norwood, Pa., assignor to Westinghouse Electric Corporation, East Pittsburgh, Pa., a corporation of Pennsylvania Application February 29, 1952, Serial No. 274,086

3 Claims. (Cl. 253—39.15)

This invention relates to turbine power plants, particularly to blading therefor, and has for an object the provision of improved blades and cooling means therefor in such a power plant.

Another object of the invention is to provide an improved heat-withstanding blade incorporating internal cooling means effective to facilitate dissipation of heat from the blade for rendering the use of efficiently high turbine inlet temperatures practicable.

A feature of the invention subsists in provision of a hollow blade having interior flow guiding means and containing a quantity of material, such as sodium, which is adapted to be vaporized by the heat to which the blade is subjected incident to operation of the turbine with a desirably high inlet temperature, and then condensed for transferring heat to an external cooling medium.

These and other objects are effected by the invention as will be apparent from the following description taken in connection with the accompanying drawings, forming a part of this application, in which:

Fig. 1 is a fragmentary diagrammatic sectional view of a turbine rotor equipped with improved blading and cooling means constructed in accordance with the invention;

Fig. 2 is an enlarged fragmentary view showing one of the blades of Fig. 1 in detailed section;

Fig. 3 is a sectional view taken along the line III—III of Fig. 2; and

Fig. 4 is a fragmentary sectional view taken along the line IV—IV of Fig. 2.

Referring to Fig. 1 of the drawing, a turbine power plant 10 is illustrated, comprising a casing structure 11 having formed therein an annular motive fluid flow passage 12, which is adapted to conduct hot motive fluids supplied at 12a from a suitable source and exhausting at 12b. Operatively mounted in suitable bearings, not shown, is a hollow turbine rotor 17, in which is formed a cooling chamber 18 communicating at one end through an axial inlet 18a with a cooling fluid supply source (not shown) and having at the opposite end a cooling fluid discharge outlet 18b. A number of annular ribs 20 may be formed on the interior wall of the rotor 17, between which ribs are welded or otherwise suitably mounted a number of rows of blades 22, 23, 24 and 25, each row representing a different turbine expansion stage.

According to the invention, these blades are constructed and arranged to facilitate operation of the turbine at high motive fluid temperatures, favorable to attainment of high thermal efficiency, while heat is constantly dissipated from the blades to prevent deterioration thereof. As best shown in Fig. 2, illustrating a representative blade 22 in greater detail, each blade comprises an outer vane portion 30, which is adapted to extend into the stream of hot fluids motivating the turbine, and integral root portion 31, which projects inwardly into the cooling chamber 18 and preferably carries a plurality of heat transfer fins 32. The vane portion 30 and root portion 31 may be initially formed as separate sections and then welded together. Extending through both portions 30 and 31 of the blade 22 is a chamber 35, in which is deposited a quantity of a suitable material, preferably a liquid metal, which will vaporize at a temperature approximating that at which the blade is to be maintained, which may be about 1200° F. Such a material may be sodium or potassium, or one of the compounds thereof. The quantity of sodium or other material thus utilized will, in its condensed or liquid form, amount to only a fraction of the volume of the closed chamber 35, so that upon partial vaporization of the material the vapor will have room to circulate in the chamber. Each blade 22 further comprises interior flow guide baffle structure 40, which may be formed of suitable sheet metal and introduced into the chamber 35 when the vane and root sections of the blade are assembled together. Openings 41 and 42 are provided at the opposite end of the baffle structure 40, to facilitate flow of the sodium or other cooling material in either its liquid or vaporized form. Openings or louvres 43 are also formed in the baffle structure 40, intermediate the ends thereof, for the same purpose.

Owing to the high motive fluid temperatures to which each of the turbine blades is subjected during operation of the turbine power plant 10, the quantity of sodium or other cooling material contained in the chamber 35 will be rendered fluid. Sodium in liquid form will be thrown radially outward into the region of the chamber 35 adjacent the opening 42, as indicated by the dotted line S, for example, and owing to absorption of heat from the gases flowing over the blade, will tend to become vaporized, thus increasing the withdrawal of heat from the vane portion 30 of the blade. As the sodium becomes vaporized, its specific gravity is decreased to a very low value, hence the centrifugal forces have little or no effect in restraining its flow. Accordingly, the vaporized sodium displaced from the outer end of the chamber 35 will flow through the openings 42 and 43 into the portion 35a of chamber 35 defined within the baffle structure 40. Upon circulation of such sodium vapor into the portion of the chamber within the root portion 31, heat will be dissipated into the cooling fluid in rotor chamber 18 into which the root portion projects. The sodium vapor, thus cooled, is then condensed and returned by centrifugal force to the end of the chamber 35 in the hot vane portion 30 of the blade.

This cycle of vaporization and condensation of the quantity of sodium or other cooling material contained within each blade incident to the effect of centrifugal force and difference in density developed in the fluid, will promote circulation thereof at sufficient velocity to afford a high heat transfer rate, so that adequate cooling of the turbine blading will be ensured, rendering feasible high turbine inlet temperatures and correspondingly high thermal efficiency in operation.

What is claimed is:

1. In a turbine, a hollow rotor, means forming a path for hot motive fluid about said rotor, means for transmitting a cooling fluid through said rotor, and a plurality of radially extending blades mounted on said rotor, each of said blades comprising a vane portion disposed outwardly of said rotor in the path of hot motive fluid and a root portion extending into said rotor in heat exchange relation with said cooling fluid therein, said vane and root portions having a closed chamber formed therein, tubular baffle structure disposed in said chamber in coaxial relation with said blade, said baffle structure having openings formed in the opposite ends thereof and louvres formed therein intermediate said ends, said end openings and said louvres operatively connecting said chamber and the interior of said baffle, and a quantity of material having a high boiling point disposed in said chamber, said material being adapted to become vaporized by absorption of heat in the portion of said chamber in said vane portion, said vaporized material being condensed upon flow into the portion of said chamber within said root portion owing to dissipation of heat into said cooling fluid passing through the rotor, whereby each of said blades is maintained resistant to the heat of the turbine motivating fluid.

2. A blade for a turbine rotor of the class provided with a plurality of blades having root and vane portions and attached thereto at their root portions, wherein the root portions extend radially inwardly toward the rotor axis and the vane portions are disposed radially outwardly of the rotor and the root portions; said blade comprising a vane portion and a root portion, said vane portion being adapted for contact with hot motive fluid and said root portion being remote therefrom and adapted for contact with cooling fluid, a closed chamber formed in said blade and extending into said vane and root portions, flow guide means disposed in said chamber, said means comprising tubular baffle structure having a passage extending along the blade axis and having openings at the opposite ends and louvres intermediate said ends, said end openings and said louvres operatively connecting said chamber and the interior of said baffle, and a body of sodium therein of less volume in the liquid state than that of said chamber, said sodium being adapted to become vaporized by heat of motive fluid applied to said vane portion and to become condensed upon flow to said root portion for facilitating cooling of the blade.

3. In a turbine having a flow passage for hot motive fluid, a hollow rotor having an interior chamber for flow of cooling fluid, a plurality of radially disposed blades carried by said rotor, each of said blades having an outer portion extending into said motive fluid passage and an inner root portion projecting into said interior chamber, each of said blades having formed therein a cooling chamber containing a quantity of material adapted to vaporize at temperatures to which said outer blade portion is normally subjected and to condense at temperatures to which said blade root portion is subjected, said cooling chamber extending into said outer portion and into said root portion, and baffle means disposed in said cooling chamber of each blade for facilitating flow of such material in condensed form toward said outer portion during rotation of said rotor, said baffle means comprising a hollow element having one open end extending into said root portion of the blade and an opposite open end extending into said outer portion of the blade, said hollow element having louvres formed therein intermediate said ends, said open ends and said louvres operatively connecting said cooling chamber and the interior of said hollow element.

References Cited in the file of this patent

UNITED STATES PATENTS

| | | |
|---|---|---|
| 2,407,164 | Kimball | Sept. 3, 1946 |
| 2,501,038 | Fransson | Mar. 21, 1950 |
| 2,559,131 | Oestrich | July 3, 1951 |
| 2,565,594 | Constant | Aug. 28, 1951 |
| 2,613,909 | Hawthorne | Oct. 14, 1952 |

FOREIGN PATENTS

| | | |
|---|---|---|
| 229,933 | Switzerland | Feb. 16, 1944 |
| 610,737 | Great Britain | Oct. 20, 1948 |
| 897,710 | France | June 5, 1944 |
| 907,059 | France | June 11, 1945 |